United States Patent
Wang et al.

(10) Patent No.: US 9,876,899 B2
(45) Date of Patent: Jan. 23, 2018

(54) METHOD AND DEVICE FOR CALLING IN MUTE MODE

(71) Applicant: ZTE Corporation, Shenzhen (CN)

(72) Inventors: Bin Wang, Shenzhen (CN); Qian Yin, Shenzhen (CN); Qiangguo Zhou, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 15/121,055

(22) PCT Filed: Jun. 11, 2014

(86) PCT No.: PCT/CN2014/079691
§ 371 (c)(1),
(2) Date: Aug. 24, 2016

(87) PCT Pub. No.: WO2015/123943
PCT Pub. Date: Aug. 27, 2015

(65) Prior Publication Data
US 2016/0373574 A1 Dec. 22, 2016

(30) Foreign Application Priority Data
Feb. 24, 2014 (CN) .......................... 2014 1 0063252

(51) Int. Cl.
*H04M 3/42* (2006.01)
*H04M 1/00* (2006.01)
(Continued)

(52) U.S. Cl.
CPC ........... *H04M 3/02* (2013.01); *H04M 19/045* (2013.01); *H04M 19/047* (2013.01)

(58) Field of Classification Search
CPC ...................................................... H04M 3/02
(Continued)

(56) References Cited

U.S. PATENT DOCUMENTS 6,928,306 B2 * 8/2005 Matsuda ............... H04M 19/04
455/418
6,968,216 B1 * 11/2005 Chen ................. H04M 1/72566
455/566

(Continued)

FOREIGN PATENT DOCUMENTS

CN          1501732 A        6/2004
CN         101742719 A       6/2010
(Continued)

OTHER PUBLICATIONS

International Search Report for corresponding application PCT/CN2014/079691 filed on Jun. 11, 2014; dated Dec. 1, 2014.
(Continued)

*Primary Examiner* — Khai N Nguyen
(74) *Attorney, Agent, or Firm* — Cantor Colburn LLP (57) ABSTRACT

Provided are a method and device for calling in a mute mode. The method includes that: when a terminal receives an incoming call, a current mode of the terminal is detected; and in the case where the terminal is in a mute mode, a call ring tone and/or vibration of the terminal are/is enabled according to a pre-set condition, so as to prompt a user to answer a call.

8 Claims, 5 Drawing Sheets

When a terminal receives an incoming call, a current mode of the terminal is detected — S102

In the case where the terminal is in a mute mode, a call ring tone and/or vibration of the terminal is enabled according to a pre-set condition, so as to prompt a user to answer a call — S104

(51) Int. Cl.
*H04M 3/00* (2006.01)
*H04M 9/00* (2006.01)
*H04M 3/02* (2006.01)
*H04M 19/04* (2006.01)

(58) Field of Classification Search
USPC ............. 379/201.01, 201.04, 207.02, 421
See application file for complete search history.

(56) References Cited

U.S. PATENT DOCUMENTS

| | | | | |
|---|---|---|---|---|
| 8,532,627 | B1* | 9/2013 | Nassimi | H04M 3/42153 340/7.28 |
| 8,644,801 | B1* | 2/2014 | Nassimi | H04M 3/42153 340/7.28 |
| 8,954,038 | B2* | 2/2015 | Nassimi | H04M 3/42153 340/7.28 |
| 2001/0014616 | A1* | 8/2001 | Matsuda | H04M 19/04 455/567 |
| 2002/0052225 | A1* | 5/2002 | Davis | H04M 1/72566 455/567 |
| 2003/0054865 | A1* | 3/2003 | Byers | H04M 1/642 455/567 |
| 2005/0008135 | A1* | 1/2005 | Bressler | H04M 1/57 379/211.01 |
| 2005/0181838 | A1* | 8/2005 | Matsuda | H04M 19/04 455/567 |
| 2006/0147002 | A1* | 7/2006 | Desai | H04M 1/2535 379/100.06 |
| 2009/0170532 | A1* | 7/2009 | Lee | H04M 1/72566 455/456.3 |
| 2009/0252303 | A1* | 10/2009 | Agarwal | H04M 1/274566 379/37 |
| 2010/0004024 | A1* | 1/2010 | Wu | H04M 1/72566 455/565 |
| 2011/0003587 | A1* | 1/2011 | Belz | H04M 19/04 455/419 |
| 2013/0267280 | A1 | 10/2013 | Delco et al. | |
| 2014/0113581 | A1* | 4/2014 | Nassimi | H04M 3/42153 455/404.1 |
| 2016/0373574 | A1* | 12/2016 | Wang | H04M 3/02 |

FOREIGN PATENT DOCUMENTS

| | | |
|---|---|---|
| CN | 102088515 A | 6/2011 |
| CN | 103002141 A | 3/2013 |
| CN | 103024151 A | 4/2013 |

OTHER PUBLICATIONS

Supplemental European Search Report dated Jan. 9, 2017 re: Application No. PCT/CN2014/079691; pp. 1-8; citing US 2013/267280 A1, CN 103 002 141 A and CN 102 088 515 A.

* cited by examiner

METHOD AND DEVICE FOR CALLING IN MUTE MODE

TECHNICAL FIELD

The present invention relates to the field of mobile communications, and in particular to a method and device for calling in a mute mode.

BACKGROUND

At present, most of communication terminals support the mute mode (that is, a no-disturbing function). Thus, in some occasions (for instance, in a conference or sleep), a user is protected from disturbance of a call ring. However, on the other hand, it is also possible that some emergency or important calls are missed.

In the conventional art, when a telephone is in a mute mode, a terminal user may miss some emergency or important incoming calls, thereby reducing the user experience.

SUMMARY

The present invention provides a method and device for calling in a mute mode, which are intended to solve the problem of low user experience caused by the fact that when a telephone is in a mute mode, a terminal user usually misses some emergency or important incoming calls in the traditional art.

According to one aspect of the present invention, a method for calling in a mute mode is provided, which may include that: when a terminal receives an incoming call, a current mode of the terminal is detected; and in the case where the terminal is in a mute mode, a call ring tone and/or vibration of the terminal are/is enabled according to a pre-set condition, so as to prompt a user to answer the incoming call.

Preferably, the step that the call ring tone and/or vibration of the terminal are/is enabled according to the pre-set condition in the case where the terminal is in the mute mode may include that: in the case where the terminal is in the mute mode, it is detected whether the caller ID of the incoming call is configured to support enabling of the call ring tone and/or vibration; and in the case where the caller ID is configured to support enabling of the call ring tone and/or vibration, the call ring tone and/or vibration of the terminal are/is enabled according to the pre-set condition, so as to prompt the user to answer the call.

Preferably, the step that the call ring tone and/or vibration of the terminal are/is enabled according to the pre-set condition in the case where the terminal is in the mute mode may further include that: in the case where the terminal is in the mute mode, it is detected whether a current condition satisfies the pre-set condition, wherein the pre-set condition at least includes one of: a condition that the number of calls from the caller ID reaches a pre-set number and a condition that a ringing duration reaches pre-set time; and in the case where the current condition satisfies the pre-set condition, the statistical quantity of incoming calls under the current condition is cleared, and the call ring tone and/or vibration of the terminal are/is enabled, so as to prompt the user to answer the call.

Preferably, before it is detected whether the current condition satisfies the pre-set condition, the method may further include that: in the case where a first call from the caller ID is not answered, the number of calls from the caller ID is calculated; and in the case where calls from the caller ID are not received again within a predetermined time period, calculation of the number of calls from the caller ID is abandoned.

Preferably, before it is detected whether the current condition satisfies the pre-set condition, the method may further include that: in the case where a first call from the calling terminal is not answered, a short message or an automatic voice response prompts the calling terminal to continuously initiate a call, so as to change a ringing mode.

According to another aspect of the present invention, a device for calling in a mute mode is provided, which may include: a detection module, configured to detect, when a terminal receives an incoming call, a current mode of the terminal; and a ring tone enabling module, configured to enable, in the case where the terminal is in a mute mode, a call ring tone and/or vibration of the terminal according to a pre-set condition, so as to prompt a user to answer a call.

Preferably, the ring tone enabling module may include: a first detection unit, configured to detect, in the case where the terminal is in the mute mode, whether the caller ID of the incoming call is configured to support enabling of the call ring tone and/or vibration; and a first ring tone enabling unit, configured to enable, in the case where the caller ID is configured to support enabling of the call ring tone and/or vibration, the call ring tone and/or vibration of the terminal according to the pre-set condition, so as to prompt the user to answer the call.

Preferably, the ring tone enabling module may include: a second detection unit, configured to detect, in the case where the terminal is in the mute mode, whether a current condition satisfies the pre-set condition, wherein the pre-set condition at least includes one of: a condition that the number of calls from the caller ID reaches a pre-set number, and a condition that a ringing duration reaches pre-set time; and a second ring tone enabling unit, configured to clear, in the case where the current condition satisfies the pre-set condition, the statistical quantity of incoming calls under the current condition, and enable the call ring tone and/or vibration of the terminal, so as to prompt the user to answer the call.

Preferably, the ring tone enabling module may further include: a calculation unit, configured to calculate, in the case where a first call from the caller ID is not answered, the number of calls from the caller ID, and abandon, in the case where calls from the caller ID are not received again within a predetermined time period, calculating the number of calls from the caller ID.

Preferably, the ring tone enabling module may further include: a reminding unit, configured to prompt, in the case where a first call from the calling terminal is not answered, the calling terminal to continuously initiate a call by means of a short message or an automatic voice response, so as to change a ringing mode.

The embodiments of the present invention can detect whether a terminal is in a mute mode in advance, and enable, if the terminal is in the mute mode, a call ring tone and/or vibration of the terminal according to a pre-set condition, so that a user can also answer some important calls according to pre-settings even if the terminal is in the mute mode, thereby improving the user experience, and solving the problem that when a telephone is in a mute mode, a terminal user usually misses some emergency or important incoming calls.

DETAILED DESCRIPTION OF THE EMBODIMENTS

In order to solve the problem of low user experience caused by the fact that when a telephone is in a mute mode, a terminal user usually misses some emergency or important incoming calls in the traditional art, the present invention provides a method and device for calling in a mute mode. The present invention is further illustrated below in conjunction with the drawings and the embodiments in detail. It will be appreciated that specific embodiments described herein are merely used to explain the present invention, and do not limit the present invention.

Figure 1:
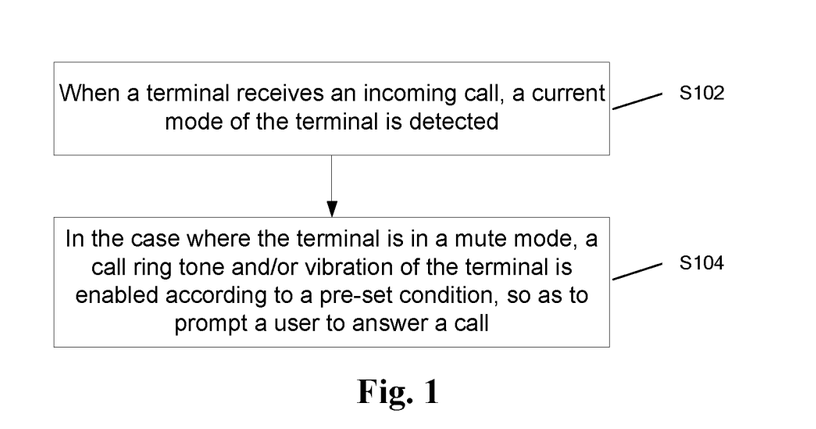
FIG. 1 is a flowchart of a method for calling in a mute mode in an embodiment of the present invention.

An embodiment of the present invention provides a method for calling in a mute mode. As shown in FIG. 1, the flow of the method includes Step S102 to Step 104 as follows.

S102: When a terminal receives an incoming call, a current mode of the terminal is detected.

S104: In the case where the terminal is in a mute mode, a call ring tone and/or vibration of the terminal are/is enabled according to a pre-set condition, so as to prompt a user to answer a call.

The embodiment of the present invention can detect whether a terminal is in a mute mode in advance, and enable, if the terminal is in the mute mode, a call ring tone and/or vibration of the terminal according to a pre-set condition, so that a user can also answer some important calls according to pre-settings even if the terminal is in the mute mode, thereby improving the user experience, and solving the problem that when a telephone is in a mute mode, a terminal user usually misses some emergency or important incoming calls.

In an implementation process, the caller IDs can be set in advance. For instance, those telephone number expected not to be missed are set to support enabling of the call ring tone and/or vibration, so in the case where the terminal is in the mute mode, and it is necessary to detect whether the caller ID is configured to support enabling of the call ring tone and/or vibration; if the caller ID is configured to support enabling of the call ring tone and/or vibration, the call ring tone and/or vibration of the terminal are/is enabled according to the pre-set condition, so as to prompt the user to answer the call; and if the caller ID is not configured to support enabling of the call ring tone and/or vibration, processing is carried out in accordance with a normal mute mode.

It can be detected whether a current condition satisfies the pre-set condition in multiple manners. For instance, the pre-set condition may be a condition that the number of calls from the caller ID reaches a pre-set number, or a condition that a ringing duration reaches pre-set time, or the combination of the two conditions. During implementation, it can be separately detected whether the number of calls from the caller ID reaches the pre-set number, and if so, the current condition satisfies the pre-set condition. Or, it can be separately detected whether the ringing duration reaches the pre-set time, and if so, the current condition satisfies the pre-set condition. Certainly, the calling process can be further optimized by means of dual detections. For instance, after the ringing duration reaches the pre-set time, the number of calls starts to be calculated.

When the current condition satisfies the pre-set condition, the statistical quantity of incoming calls, corresponding to the caller ID, under the current condition is cleared, and the call ring tone and/or vibration of the terminal are/is enabled, so as to prompt the user to answer the call.

In the calling process, if a first call from the caller ID is not answered, the number of calls from the caller ID can start to be calculated; and in the case where calls from the caller ID are not answered again within a predetermined time period, calculation of the number of calls from the caller ID is abandoned, wherein the predetermined time period can be set as 20S or 30S.

Before it is detected whether the current condition satisfies the pre-set condition, that is, in the case where a first call from the calling terminal is not answered, a short message, an automatic voice response or the like can be adopted to prompt the calling terminal to continuously initiate a call, so as to change a ringing mode.

Figure 2:
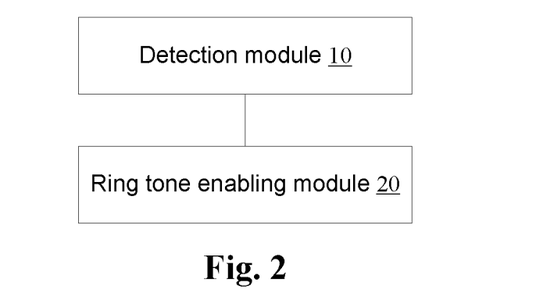
FIG. 2 is a structural diagram of a device for calling in a mute mode in an embodiment of the present invention.

An embodiment of the present invention also provides a device for calling in a mute mode. As shown in FIG. 2, the device structurally includes:

a detection module 10, configured to detect, when a terminal receives an incoming call, a current mode of the terminal; and a ring tone enabling module 20, coupled to the detection module, and configured to enable, in the case where the terminal is in a mute mode, a call ring tone and/or vibration of the terminal according to a pre-set condition, so as to prompt a user to answer a call.

Figure 3:
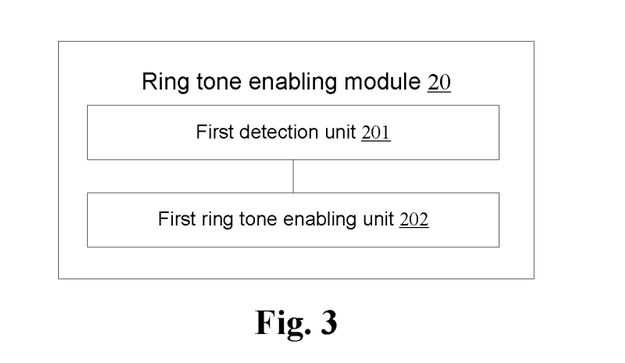
FIG. 3 is a first structural diagram of a ring tone enabling module of a device for calling in a mute mode in an embodiment of the present invention.

FIG. 3 shows a first structural diagram of the ring tone enabling module 20. The module includes: a first detection unit 201, configured to detect, in the case where the terminal is in the mute mode, whether a caller ID is configured to support enabling of the call ring tone and/or vibration; and a first ring tone enabling unit 202, coupled to the first detection unit 201, and configured to enable, in the case where the caller ID is configured to support enabling of the call ring tone and/or vibration, the call ring tone and/or vibration of the terminal according to the pre-set condition, so as to prompt the user to answer the call.

Figure 4:
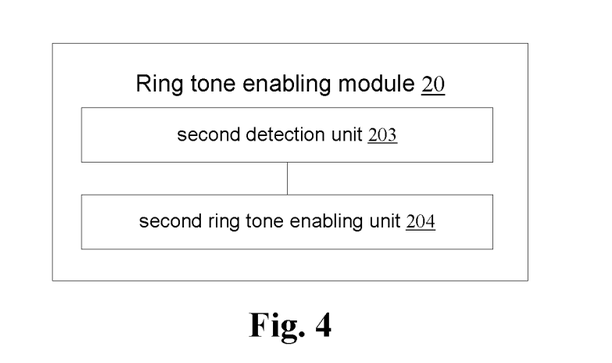
FIG. 4 is a second structural diagram of a ring tone enabling module of a device for calling in a mute mode in an embodiment of the present invention.

FIG. 4 shows a second structural diagram of the ring tone enabling module 20. The ring tone enabling module 20 in FIG. 4 includes: a second detection unit 203, configured to detect, in the case where the terminal is in the mute mode, whether a current condition satisfies the pre-set condition, wherein the pre-set condition at least includes one of: a condition that the number of calls from the caller ID reaches a pre-set number and a condition that a ringing duration reaches pre-set time; and a second ring tone enabling unit 204, coupled to the second detection unit 203, and configured to clear, in the case where the current condition satisfies the pre-set condition, the statistical quantity of incoming calls under the current condition, and enable the call ring tone and/or vibration of the terminal, so as to prompt the user to answer the call.

In a preferred implementation process, the ring tone enabling module 20 in FIG. 3 and the ring tone enabling module 20 in FIG. 4 are integrated into one module, in which different units are activated to work under different conditions.

Figure 5:
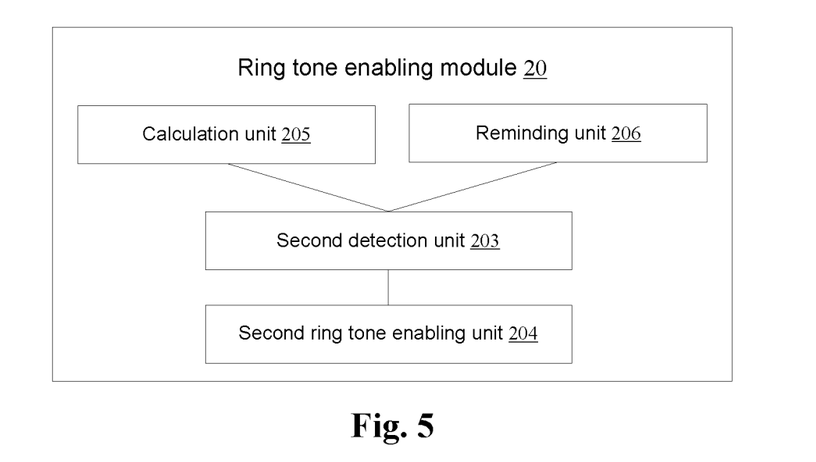
FIG. 5 is a second preferred structural diagram of a ring tone enabling module of a device for calling in a mute mode in an embodiment of the present invention.

FIG. 5 shows a preferred structural diagram of the second ring tone enabling module 20. The ring tone enabling module 20 further includes:

a calculation unit 205, coupled to the second detection unit 203, and configured to calculate, in the case where a first call from the caller ID is not answered, the number of calls from the caller ID, and abandon, in the case where calls from the caller ID are not answered again within a predetermined time period, calculating the number of calls from the caller ID; and a reminding unit 206, coupled to the second detection unit 203, and configured to prompt, in the case where a first call from the calling terminal is not answered, the calling terminal to continuously initiate a call by means of a short message or an automatic voice response, so as to change a ringing mode.

Certainly, those skilled in the art can arrange the device for calling in a mute mode in a terminal or a mobile terminal according to the disclosed content, and similar arrangement manners are all within the protective scope of the embodiments of the present invention, which will not be elaborated herein.

Preferred Embodiment

The preferred embodiment of the present invention provides a method for calling in a mute mode. The method can trigger some user/number calls to enter an emergency callback state by means of a certain policy. The emergency callback state can allow these calls to enable ring tone or vibration prompts in a mute mode, in order that users originating calls obtain timely responses as far as possible so as to reduce the probability of missing emergency calls in the mute mode to the greatest extent.

According to a method for calling in a mute mode via a mobile communication terminal, provided by the embodiment of the present invention, firstly, it is necessary to set a user or terminal number supporting emergency callback (a manner capable of calling by means of ring tones or vibrations); then, the user/number supporting emergency callback is triggered to enter an emergency callback state according to a pre-configuration rule, and a feedback can be given to an opposite party; a call ringing instruction is received in the mute mode, and if the call user/number is in an emergency callback mode, ring tone or vibration prompts are enabled; and finally, the user/number exits from the emergency callback state according to a certain policy.

A processing flow of an emergency callback function may refer to the steps as follows.

(1) After a terminal receives a call prompt, it is judged whether the terminal is in a mute mode, if the terminal is not in the mute mode, a normal processing flow is executed, and otherwise, Step (2) is executed.

(2) It is judged whether a caller ID/user is configured to support emergency callback, if not, the normal processing flow is executed, and otherwise, Step (3) is executed.

(3) It is judged whether the caller ID/user is in an emergency callback mode, if so, a call prompt (ring tone or vibration) is enabled, and otherwise, Step (4) is executed.

(4) If an incoming call is normally answered, the normal processing flow is executed, and otherwise, Step (5) is executed.

(5) If the incoming call satisfies a certain policy, a corresponding user/ID enables the emergency callback mode, and an automatic voice response and a short message can prompt that an opposite party has entered the emergency callback mode.

(6) After the user/ID enters emergency callback, it is necessary to exit from an emergency callback state under a certain condition. For instance, a call from the user/ID is not received within certain time (such as two minutes); the call from the user/ID is answered (except an automatic response); the terminal actively calls the user/ID; the mute mode is canceled; the terminal is started up/shut down; and the user/ID cancels supporting of emergency callback.

The implementation (that is, a method for calling in a mute mode) of an emergency callback function is described below in conjunction with the drawings in detail.

Figure 6:
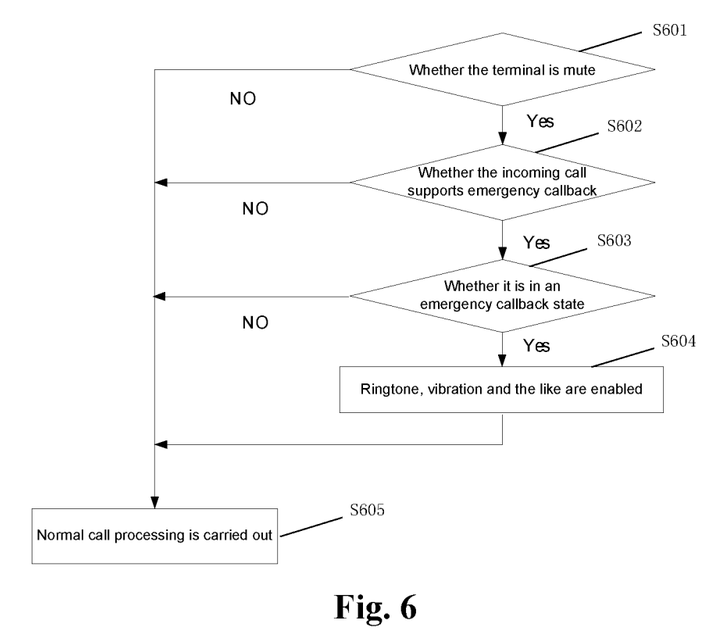
FIG. 6 is a processing flowchart of an incoming call in a preferred embodiment of the present invention.

FIG. 6 is a processing flowchart of an incoming call, which includes Step S601 to Step S605 as follows.

S601: After a terminal receives a call ringing prompt, it is judged whether the terminal is in a mute mode, if the terminal is not in the mute mode, S605 is executed, and otherwise, S602 is executed.

S602: It is judged whether the caller ID/user is configured to support emergency callback, if not, S605 is executed, otherwise, S603 is executed.

S603: It is judged whether the caller ID/user is in an emergency callback, if yes, S604 is executed, otherwise, turn to S605.

S604: A call prompt (ring tone or vibration) is enabled.

S605: A call request is processed in accordance with a normal processing flow.

Figure 7:
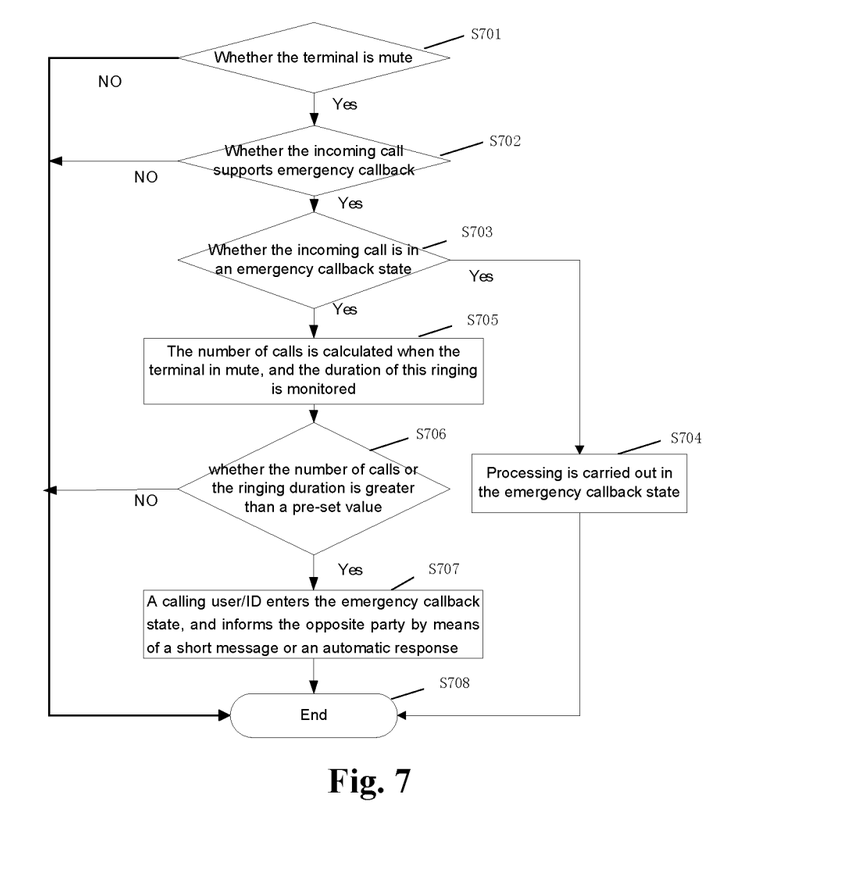
FIG. 7 is a flowchart showing triggering of an emergency callback mode via an incoming call in a preferred embodiment of the present invention.

FIG. 7 is a flowchart showing triggering of an emergency callback mode via an incoming call, which includes Step S701 to Step S708 as follows.

S701: After a terminal receives a call ringing prompt, it is judged whether the terminal is in a mute mode, if the terminal is not in the mute mode, S708 is executed, and otherwise, S702 is executed.

S702: It is judged whether a caller ID/user is configured to support emergency callback, if not, S708 is executed, and otherwise, S703 is executed.

S703: It is judged whether the caller ID/user is in an emergency callback state, if so, S704 is executed, and otherwise, S705 is executed.

S704: Processing is carried out in the emergency callback state.

S705: The number of calls from the user/ID after the terminal is mute is calculated, and a ringing duration of this call is monitored.

S706: It is judged whether the number of calls or the ringing duration is greater than a pre-set value so as to determine whether to enter the emergency callback state, if so, S707 is executed, and otherwise, S708 is executed.

Determining whether to enter the emergency callback state may specifically refer to the following manner: if the duration after a calling user receives a ringing instruction is greater than a certain threshold such as 20 s after the terminal is mute, entering the emergency callback state; and if the number of successive calls from the calling user/ID is greater than a certain threshold such as 3 times after the terminal is mute, entering the emergency callback state. After entering the emergency callback state, it is necessary to clear calls from the user/ID.

S707: The calling user/ID enters the emergency callback state, and informs an opposite party by means of a short message or an automatic response. After entering the emergency callback mode, the terminal can remind an opposite terminal using the following manner that: if the ringing duration exceeds the pre-set value, the emergency callback mode is triggered, and in this case, an opposite party can be directly prompted that the terminal is in a conference/no-disturbing mode and the opposite party will be awakened by continuous callback based on a current scenario mode by means of an automatic voice response; and if the number of successive calls from the calling user/ID is greater than a certain threshold, the opposite party can be prompted that the terminal is in the conference/no-disturbing mode and the opposite party will be awakened by continuous callback based on the current scenario mode by means of a short message.

S708: the processing is ended.

Figure 8:
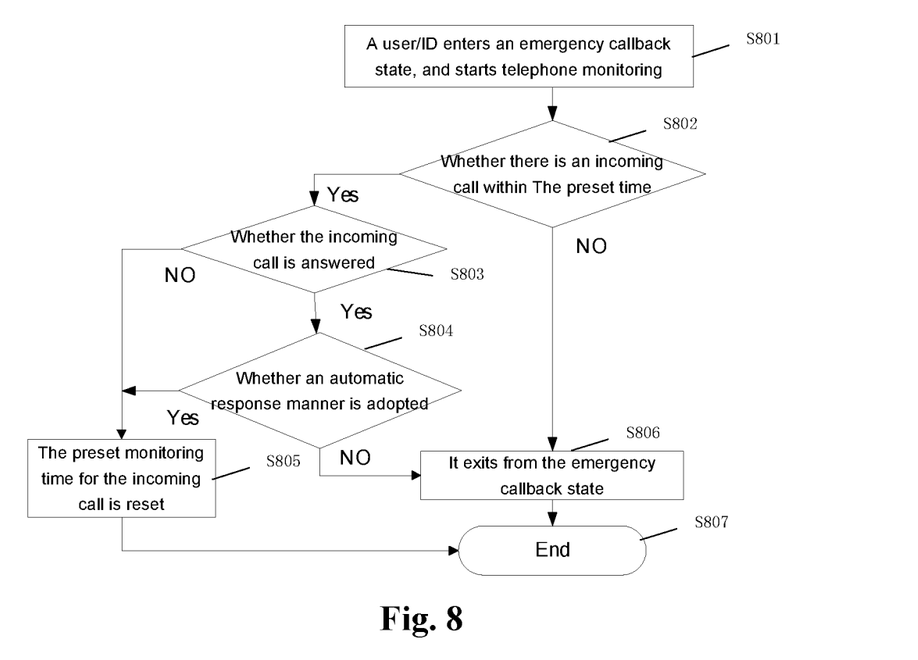
FIG. 8 is a flowchart showing exiting of an emergency callback mode in a preferred embodiment of the present invention.

FIG. 8 is a flowchart showing exiting of an emergency callback mode (state) in the case where there are no incoming calls within predetermined time or an incoming call is answered, which includes Step S801 to Step S807 as follows.

S801: After a user/ID enters an emergency callback state, telephone monitoring is started.

S802: It is judged whether there is an incoming call within pre-set time. If a call from the user/ID is not monitored within the pre-set time, Step S806 is executed, and otherwise, S803 is executed.

S803: It is judged whether the incoming call is answered. If so, Step S804 is executed, and otherwise, Step S805 is executed.

S804: It is judged whether an automatic response manner is adopted. If so, Step S805 is executed, and otherwise, Step S806 is executed.

S805: Monitoring time for the incoming call is reset, and the incoming call is continuously monitored. S807 is executed.

S806: The user/ID directly exits from the emergency callback mode.

S807: Processing is ended.

In an implementation process, the flow that the user/ID exits from the emergency callback state if the terminal actively initiates a call may include the steps that: after the user/ID enters the emergency callback state, telephone monitoring is started; and if the terminal actively calls the user/ID, the user/ID exits from the emergency callback state.

The flow that the user/ID exits from the emergency callback state if the terminal cancels silence may include the steps that: the terminal cancels silence settings; a list of all user/IDs entering the emergency callback state is acquired; and relevant users/IDs exit from the emergency callback state in sequence.

The flow that the user/ID exits from the emergency callback state if the terminal cancels startup/shutdown may include the steps that: the terminal cancels startup/shutdown operations; a list of all user/IDs entering the emergency callback state is acquired; and relevant users/IDs exit from the emergency callback state in sequence.

The flow that the user/ID exits from the emergency callback state if canceling an emergency callback supporting capability may include the steps that: the user/ID cancels the emergency callback supporting capability; and the user/ID exits from the emergency callback state.

An embodiment of the present invention also provides a mobile terminal. The mobile terminal is provided with a device for calling in a mute mode. The mobile terminal can persistently or temporarily set an emergency call supporting capability of a user/ID, can complete a normal call processing function and an emergency callback function, can control the user/ID to enter or exit from an emergency callback state, and can inform an opposite party of the emergency callback state.

Although the preferred embodiment of the present invention has been disclosed for the purposes of examples, those skilled in the art will realize that various improvements, additions and replacements are possible. Thus, the scope of the present invention shall not be limited to the above embodiments.

What is claimed is:

1. A method for calling in a mute mode, comprising:
   detecting, by a terminal, a current mode of the terminal when the terminal receives an incoming call; and
   enabling, by the terminal, in the case where the terminal is in a mute mode, a call ring tone and/or vibration of the terminal according to a pre-set condition, so as to prompt a user to answer the incoming call;
   wherein enabling, in the case where the terminal is in the mute mode, the call ring tone and/or vibration of the terminal according to the pre-set condition further comprises:
   detecting, in the case where the terminal is in the mute mode, whether a current condition satisfies the pre-set condition, the pre-set condition at least comprises one of: a condition that the number of calls from the caller ID reaches a pre-set number, and a condition that a ringing duration reaches pre-set time; and
   clearing, in the case where the current condition satisfies the pre-set condition, a statistical quantity of incoming calls under the current condition, and enabling the call ring tone and/or vibration of the terminal, so as to prompt the user to answer the call.

2. The method according to claim 1, wherein enabling, in the case where the terminal is in the mute mode, the call ring tone and/or vibration of the terminal according to the pre-set condition comprises:
   detecting, in the case where the terminal is in the mute mode, whether the caller ID of the incoming call is configured to support enabling of the call ring tone and/or vibration; and
   enabling, in the case where the caller ID is configured to support enabling of the call ring tone and/or vibration, the call ring tone and/or vibration of the terminal according to the pre-set condition, so as to prompt the user to answer the incoming call.

3. The method according to claim 1, wherein before detecting whether the current condition satisfies the pre-set condition, the method further comprises:
   calculating, in the case where a first call from the caller ID is not answered, the number of calls from the caller ID; and
   abandoning, in the case where calls from the caller ID are not received again within a predetermined time period, calculating the number of calls from the caller ID.

4. The method according to claim 3, wherein before detecting whether the current condition satisfies the pre-set condition, the method further comprises:
   prompting, in the case where a first call from the calling terminal is not answered, the calling terminal to continuously initiate a call by means of a short message or an automatic voice response, so as to change a ringing mode.

5. A terminal, comprising:
a detection module, configured to detect, when the terminal receives an incoming call, a current mode of the terminal; and
a ring tone enabling module, configured to enable, in the case where the terminal is in a mute mode, a call ring tone and/or vibration of the terminal according to a pre-set condition, so as to prompt a user to answer the incoming call;
wherein the ring tone enabling module comprises:
a second detection unit, configured to detect, in the case where the terminal is in the mute mode, whether a current condition satisfies the pre-set condition, the pre-set condition at least comprises one of: a condition that the number of calls from the caller ID reaches a pre-set number, and a condition that a ringing duration reaches pre-set time; and
a second ring tone enabling unit, configured to clear, in the case where the current condition satisfies the pre-set condition, a statistical quantity of incoming calls under the current condition, and enable the call ring tone and/or vibration of the terminal, so as to prompt the user to answer the call.

6. The terminal according to claim 5, wherein the ring tone enabling module comprises:
a first detection unit, configured to detect, in the case where the terminal is in the mute mode, whether the caller ID of the incoming call is configured to support enabling of the call ring tone and/or vibration; and
a first ring tone enabling unit, configured to enable, in the case where the caller ID is configured to support enabling of the call ring tone and/or vibration, the call ring tone and/or vibration of the terminal according to the pre-set condition, so as to prompt the user to answer the call.

7. The terminal according to claim 5, wherein the ring tone enabling module further comprises:
a calculation unit, configured to calculate, in the case where a first call from the caller ID is not answered, the number of calls from the caller ID, and abandon, in the case where calls from the caller ID are not received again within a predetermined time period, calculating the number of calls from the caller ID.

8. The terminal according to claim 7, wherein the ring tone enabling module further comprises:
a reminding unit, configured to prompt, in the case where a first call from the calling terminal is not answered, the calling terminal to continuously initiate a call by means of a short message or an automatic voice response, so as to change a ringing mode.

* * * * *